United States Patent [19]

Wildey

[11] Patent Number: 5,377,731
[45] Date of Patent: Jan. 3, 1995

[54] NARROW KERF SAW BLADE DISC FOR TREE FELLING HEAD

[75] Inventor: Allan J. Wildey, Paris, Canada

[73] Assignee: FMG Timberjack, Inc., Woodstock, Canada

[21] Appl. No.: 167,610

[22] Filed: Dec. 15, 1993

[51] Int. Cl.6 .............................................. B27B 33/08
[52] U.S. Cl. .................................. 144/241; 144/34 R; 144/218; 83/839; 83/844
[58] Field of Search ................. 83/835, 838, 839, 840, 83/841, 842, 843, 844, 845, 854; 144/34 R, 218, 241

[56] References Cited

U.S. PATENT DOCUMENTS

| | | | |
|---|---|---|---|
| 4,593,733 | 6/1986 | Hamilton | 144/34 R |
| 5,085,112 | 2/1992 | MacLennan | 83/840 |
| 5,088,371 | 2/1992 | MacLennan | 83/840 |
| 5,205,199 | 4/1993 | MacLennan | 83/839 |

OTHER PUBLICATIONS

Advertisement of Quadco Equipment Inc. from Jun., 1993 issue of *Timber Harvesting*. (2 pages, one dated Jan. 1, 1993, the other dated Feb., 1993).

Primary Examiner—Eugenia Jones
Assistant Examiner—Raymond D. Woods
Attorney, Agent, or Firm—Quarles & Brady

[57] ABSTRACT

A saw blade disc for a tree felling head has tooth holders about its periphery which support cutting teeth asymmetrically above an inner plate of the disc.

7 Claims, 3 Drawing Sheets

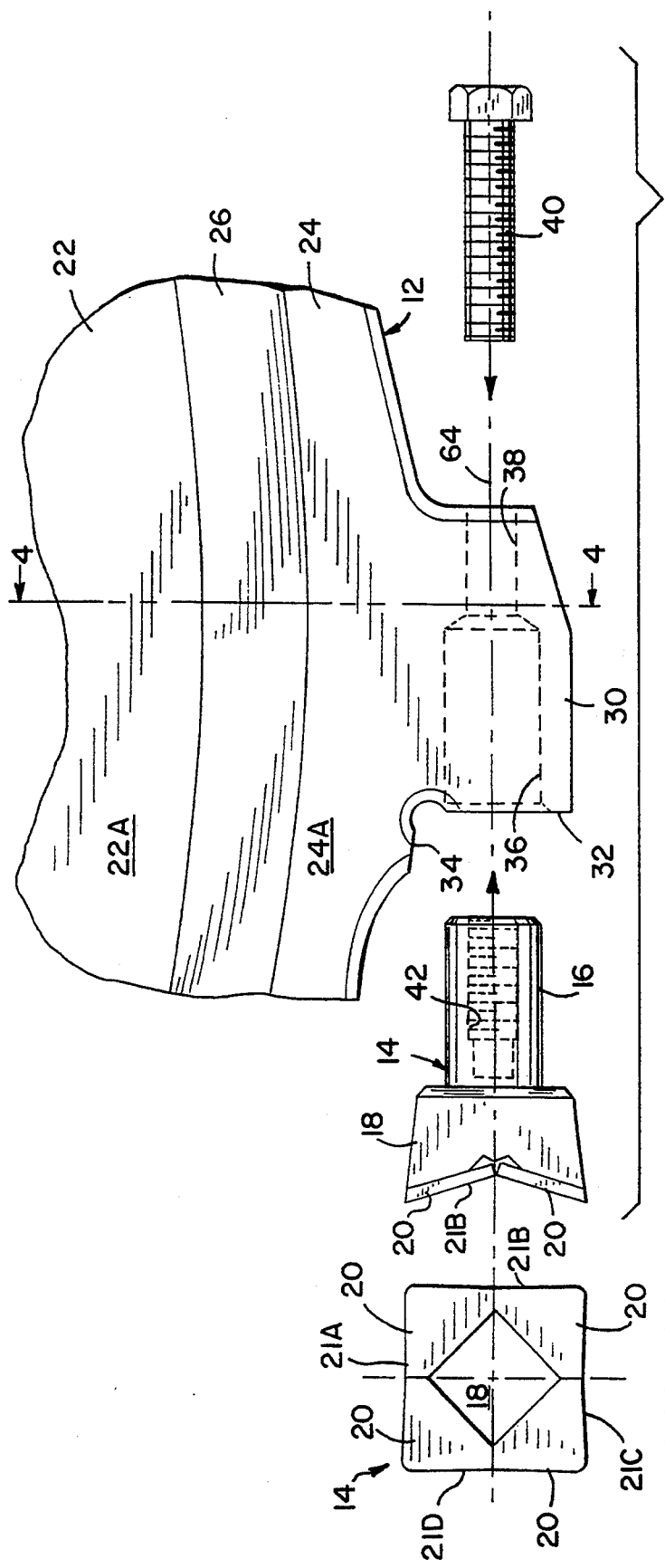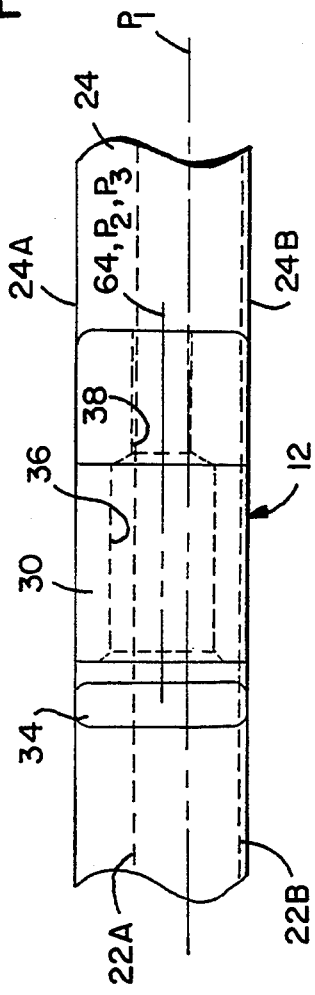

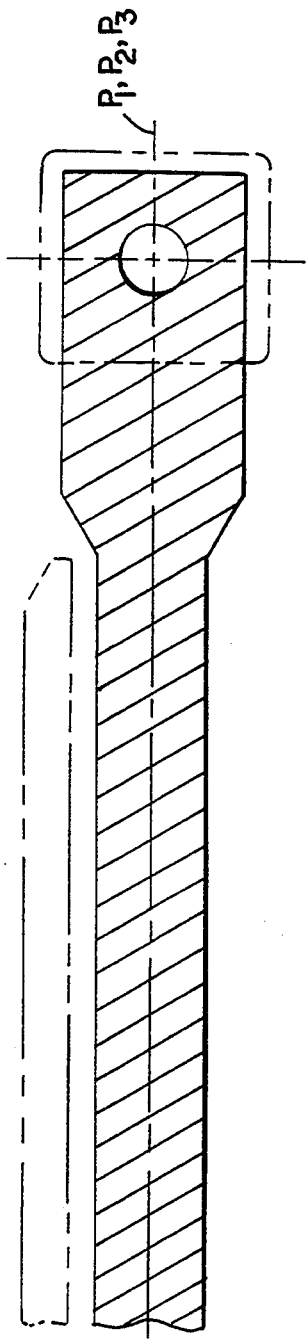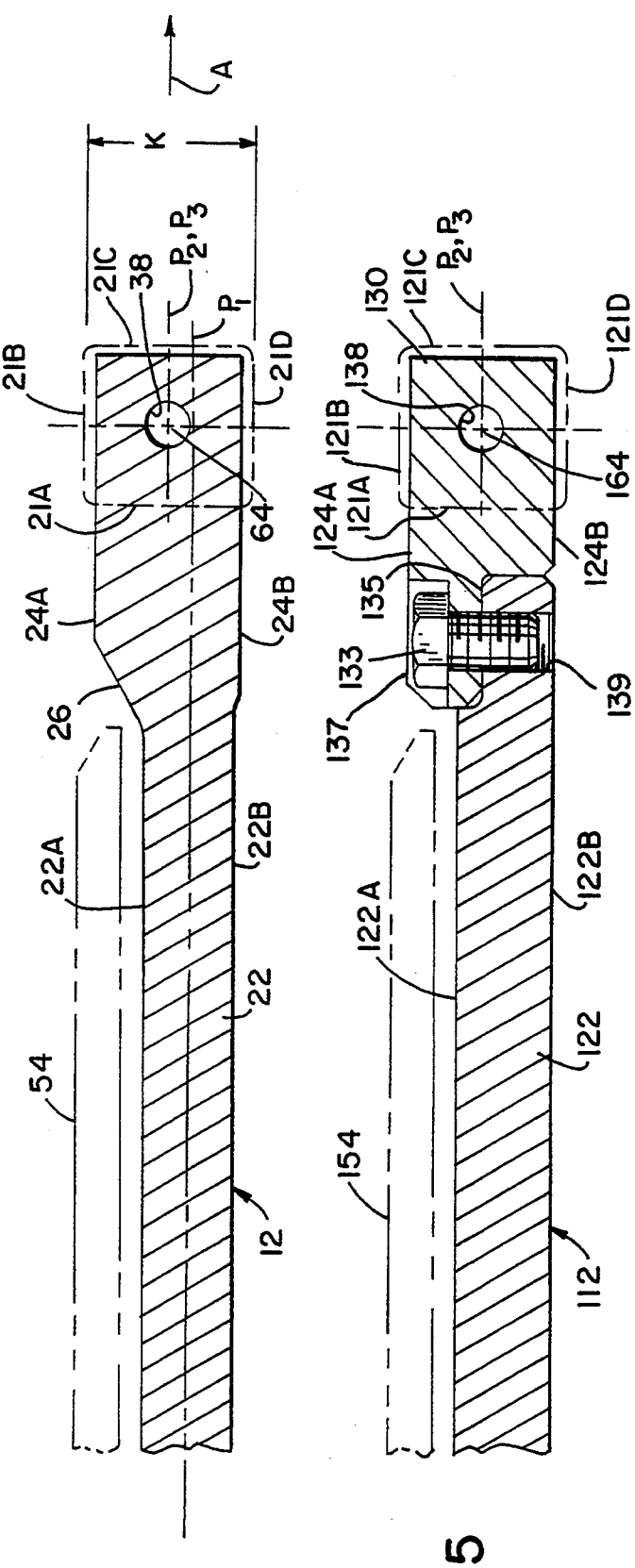
FIG. 6 (PRIOR ART)
FIG. 4
FIG. 5

NARROW KERF SAW BLADE DISC FOR TREE FELLING HEAD

FIELD OF THE INVENTION

This invention relates to a saw blade disc of the type that is used in a felling head of a tree feller buncher.

BACKGROUND OF THE INVENTION

Disc saw felling heads for tree feller bunchers are well known. These machines typically rotate a relatively large saw blade disc which has teeth mounted around its periphery about a generally vertical axis and advance the blade horizontally through a tree. As the saw blade is advanced through the tree, creating a kerf in the tree trunk, a butt plate supported on the head in close proximity to the upper surface of the saw blade disc enters the kerf to support the tree when it is cut off. Hydraulically actuated arms of the feller buncher embrace the tree to prevent it from falling while it is supported on the butt plate.

Typically, removable teeth that actually do the cutting are mounted at angularly spaced locations about the periphery of these saw blade discs. Prior blades have been symmetrical about a horizontal plane and the kerf cut in the tree has also been symmetrical about that plane. These designs have resulted in a relatively wide disc and tooth which results in a relatively wide kerf and high power required to sever a tree.

SUMMARY OF THE INVENTION

The invention provides a disc for a circular saw blade of a tree felling head of the type which has cutting teeth fixed about its periphery and is rotated about a generally vertical axis so that the teeth cut a generally horizontal kerf through a standing tree. The disc includes a circular disc plate having an upper surface and a lower surface, and a plurality of tooth holders secured to the disc plate at angularly spaced locations about the periphery thereof. Tooth holders are adapted to mount cutting teeth which define a cutting plane which is a central plane of a kerf produced by the blade. A spacing between an upper surface of the kerf and the upper surface of the plate is greater than a spacing between a lower surface of the kerf and the lower surface of plate. This allows nesting a butt plate over the disc in close proximity to the upper surface of the plate without cutting the kerf further than necessary below the lower surface of the plate. The result is that the teeth can be made smaller, resulting in reduced tooth costs and a narrower kerf, which saves energy in cutting a tree.

In a preferred aspect, each tooth holder has an upper surface and a lower surface, and the spacing between the upper surfaces of the tooth holders and the upper surface of the plate is greater than the spacing between the lower surfaces of the tooth holders and the lower surface of the plate. Preferably, the central plane of the tooth holders corresponds to the central plane of the kerf, so that insofar as the tooth holders and the teeth are concerned, the design is symmetric.

BRIEF DESCRIPTION OF THE DRAWINGS

FIG. 2A is an exploded detail view of a portion of the blade shown in FIG. 1;

FIG. 2B is a front plan view of a tooth for a saw blade of the invention;

FIG. 3 is a side plan view of the portion of the blade disc shown in FIG. 2A;

FIG. 4 is a fragmentary sectional view as viewed along the plane of the line 4—4 of FIG. 2A, and further illustrating in phantom a butt plate of a felling head which incorporates the blade disc and a tooth as it would be mounted on the blade disc;

FIG. 5 is a view similar to FIG. 4 illustrating an alternate embodiment of a blade disc of the invention having removable tooth holders; and FIG. 6 is a view similar to FIG. 4 but showing a prior art blade disc.

DETAILED DESCRIPTION OF THE PREFERRED EMBODIMENTS

Figure 1:
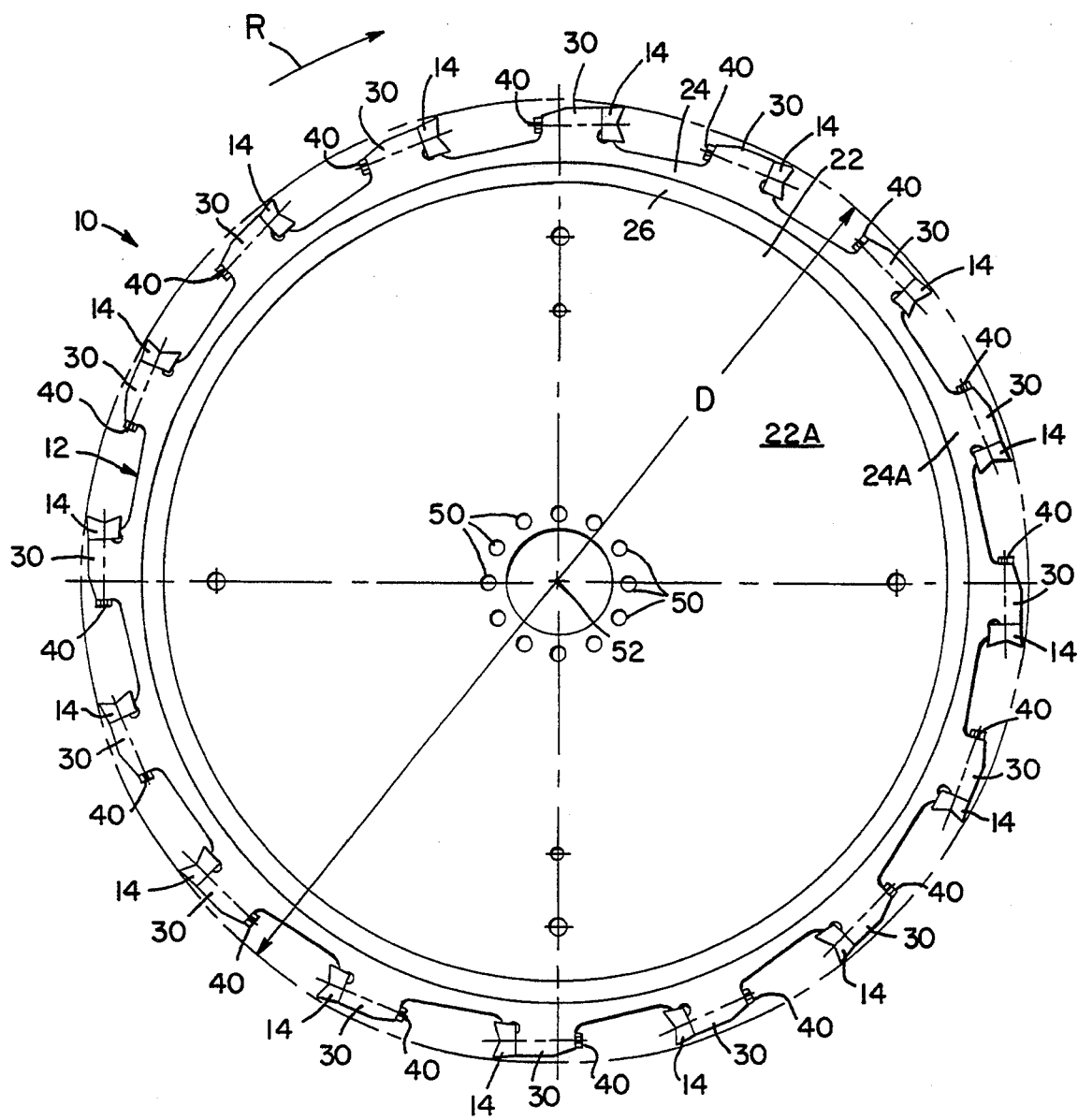
FIG. 1 is a top plan view of a saw blade incorporating a blade disc of the invention.

FIG. 1 illustrates a saw blade 10 which incorporates a blade disc 12 of the invention and also includes a plurality (16 in the embodiment illustrated) of saw teeth 14 of any suitable design. In the preferred embodiment, the saw teeth 14 are of the type having a circular cylindrical shank 16 extending rearwardly from a generally square head 18 which tapers rearwardly. As best shown in FIG. 2A, each tooth head 18 may include a carbide insert or tip 20 at each corner thereof, which, as is well known in the art, extends the life of the tooth. Each tooth head 18 has four cutting edges 21A, 21B, 21C and 21D. As taught in Morin U.S. Pat. No. 4,932,447, when the radially outermost edge (edge 21C as shown in FIGS. 2A and 4-6) of such a tooth becomes worn, the tooth may be rotated 90° or 180° to present a fresh cutting edge in the radially outermost position, which is the edge position that does most of the cutting.

The disc 12 includes a disc plate 22 and a rim 24 which is formed integrally with the plate 22 around the outer periphery of the plate 22. Upper surface 24A of the rim 24 is joined to upper surface 22A of the plate 22 with a frusto-conical surface 26 (FIG. 4) which extends upwardly and radially outwardly from the upper surface 22A. Also as shown in FIG. 4, rim 24 has a lower surface 24B which is slightly below the lower surface 22B of the plate 22.

In the preferred embodiment shown, 16 equiangularly spaced tooth holders 30 are defined in the rim 24 and are integral therewith. Each tooth holder 30 has a tooth facing surface 32, a tooth bearing surface 34, which abuts the radially inner side of the mounted tooth 14 to prevent it from rotating when it is mounted to the disc 12, a tooth bore 36 for receiving the shank 16 of the tooth 14, and a bolt bore 38 through which a bolt 40 extends. The bolt 40 is engaged in a threaded hole 42 in the shank 16 of the tooth 14 and tightened to bear the tooth head 18 against surface 32 and secure the tooth 14 to the tooth holder 30 without allowing rotation of the tooth 14 relative to the holder 30.

In operation, the saw blade 10 is mounted to a generally vertical spindle of a saw head by fasteners extending through holes 50 (12 holes 50 are shown in FIG. 1) in a conventional manner. The blade 10 is then rotated by the spindle about axis 52 (which is perpendicular to the plane of the paper as shown in FIG. 1). Rotation is in the direction of the arrow R shown in FIG. 1 and the outer radial generally vertical sides of the teeth 14 define a cutting diameter D, which in the embodiment shown is approximately 49.5 inches.

As shown in FIG. 4, the saw head includes a butt plate 54 (shown in phantom) which is stationary and is in close proximity to the upper side 22A of the plate 22. In FIG. 4, phantom lines represent the four cutting edges 21A–D of a tooth 14 mounted in the tooth holder 30 illustrated. As the blade 10 is advanced into a tree in the direction of arrow A in FIG. 4, the teeth 14 cut a generally horizontal kerf represented by height K (FIG. 4), which is approximately equal to the vertical height of the radially outer edge 21C of each tooth 14.

As the blade 10 is advanced through a tree as indicated, the lower surface of the kerf K is below the lower surface 24B of the rim 24 and below the lower surface 22B of the plate 22, and the upper surface of the kerf is above the upper surface 24A of the rim 24, and above the upper surface 22A of the plate 22, and the butt plate 54 (FIG. 4) enters the kerf to support the tree. After the blade 10 is advanced all the way through the tree, the tree is completely severed and supported on top of the butt plate 54.

The upper 22A and lower 22B surfaces of the plate 22 define a central plane P, midway between them. The tooth holders 30 define a horizontal central plane $P_2$ midway between the upper 24A and lower 24B surfaces of the rim 24. The tooth holder central plane $P_2$ includes the tangential axes 64 of the shank bores 36 and is coincident with a central plane $P_3$ defined midway between the upper 21B and lower 21D cutting edges of the teeth 14, when the teeth 14 are mounted in the tooth holders 30. The central plane $P_3$ is also the central plane of the kerf K produced by the blade. The holder central plane $P_2$ is offset upwardly from the plate central plane $P_1$ so as to displace the cutting edges, and therefore the kerf K produced by the blade 10, upwardly relative to the upper surface 22A of the plate 22.

This asymmetrical arrangement of the teeth relative to the disc plate allows the use of smaller teeth having shorter cutting edges and therefore produces a narrower kerf. In one embodiment of the invention, the kerf K is approximately 1-⅜ inches wide. This is in contrast to the prior art, shown in FIG. 6, which arranged the teeth symmetrically relative to the central plane $P_1$ of the disc plate. Thus, in the prior art arrangement, the plate central plane $P_1$, the holder central plane $P_2$, and the kerf central plane $P_3$ were all in the same plane. In one typical prior art construction, the kerf K was approximately 2-⅜ inches wide. Reducing the size of the teeth reduces the cost of manufacturing the teeth, whether the teeth are carbide tipped or not but particularly when the teeth are carbide tipped, and also reduces the power consumed in cutting down a tree since the power consumed is proportional to the width of the kerf.

An alternate embodiment of a blade disc 112 of the invention is illustrated in FIG. 5. In this embodiment, elements corresponding to the elements of the blade 10 are assigned the same reference number, plus 100.

In the blade disc 112, the tooth holders 130 are separate from the plate 122 and are separate from each other. Each tooth holder 130 may be shaped similarly to the tooth holders 30, except that each tooth holder 130 is separate from the plate 122 and from all the other tooth holders 130. Each tooth holder 130 may be secured to the plate 122 by one or more bolts 133, and the edge of the plate 122 is preferably recessed as shown at 135 to receive a lip 137 of each tooth holder 130. The head of each bolt 133 is preferably countersunk in a corresponding hole in the corresponding lip 137, and threaded into a corresponding bore 139 in the plate 122.

Preferred embodiments of the invention have been described in considerable detail. Many modifications and variations to the preferred embodiments described will be apparent to those of ordinary skill in the art which will still incorporate the invention. For example, it may be possible to make a blade in which the cutting plane $P_3$ does not lie in the same plane as the tooth holder plane $P_2$. In addition, teeth other than the type disclosed herein could be used with a disc of the invention. For example, any of the teeth of the type described in U.S. Pat. Nos. 4,932,447 or 5,205,199 could be used with a blade of the present invention. Therefore, the invention should not be limited to the embodiments disclosed, but should be defined by the claims which follow.

We claim:

1. A disc for a circular saw blade of a tree felling head of a type which has cutting teeth fixed about a periphery of the disc and is rotated about a generally vertical axis so that the teeth cut a generally horizontal kerf through a standing tree, comprising:
    a circular disc plate of a certain thickness having an upper surface, a lower surface and a central plane midway between said upper and lower surfaces; and
    a rim around said disc plate of a different thickness than said thickness of said disc plate, said rim having an upper surface, a lower surface and a central plane midway between said upper and lower surfaces of said rim, said central plane of said rim being offset from said central plane of said disc plate;
    a plurality of tooth holders carried by said rim at angularly spaced locations about a periphery thereof, each said tooth holder mounting only a single cutting tooth that defines a cutting plane which is a central plane of a kerf produced by said tooth;
    wherein said cutting plane is offset from said central plane of said plate on the side of said central plane toward said upper surface of said plate.

2. A disc as claimed in claim 1, wherein said tooth holders are adapted to mount a tooth of a type having a shank extending rearwardly from a cutting head, each said tooth holder having a generally tangential bore therethrough for receiving the tooth shank, each said bore having a central longitudinal axis, all of said bore axes lying generally in said cutting plane.

3. A disc as claimed in claim 1, wherein said tooth holders are integral with said rim.

4. A disc as claimed in claim 1, wherein said upper surface of said rim defines a frustoconical surface which extends axially above and radially outward from said upper surface of said plate at the periphery of said plate and said rim has a lower surface axially below the lower surface of said plate.

5. A disc as claimed in claim 1, wherein said rim has a central plane which generally corresponds to said cutting plane.

6. A disc as claimed in claim 1, wherein said disc plate has a generally uniform thickness.

7. A disc as claimed in claim 1, wherein said tooth holders are separable from said rim and further comprising means for securing said tooth holders to said rim.

* * * * *

REEXAMINATION CERTIFICATE (3591st)

United States Patent [19]

Wildey

[11] B1 5,377,731

[45] Certificate Issued Aug. 4, 1998

[54] NARROW KERF SAW BLADE DISC FOR TREE FELLING HEAD

[75] Inventor: Allan J. Wildey, Paris, Canada

[73] Assignee: Timberjack Corporation, Atlanta, Ga.

Reexamination Request:
No. 90/004,903, Jan. 26, 1998

Reexamination Certificate for:
Patent No.: 5,377,731
Issued: Jan. 3, 1995
Appl. No.: 167,610
Filed: Dec. 15, 1993

[51] Int. Cl.[6] ............................ B27G 13/00; A01G 23/08

[52] U.S. Cl. .................... 144/241; 144/34.1; 144/218; 83/839; 83/844

[58] Field of Search .................... 144/34.1, 218, 144/241; 83/835, 838, 839, 840, 841, 847, 843, 844, 845, 884

[56] References Cited

U.S. PATENT DOCUMENTS 4,738,291  4/1988  Isley ........................ 144/34.1

*Primary Examiner*—W. Donald Bray

[57] ABSTRACT

A saw blade disc for a tree felling head has tooth holders about its periphery which support cutting teeth asymmetrically above an inner plate of the disc.

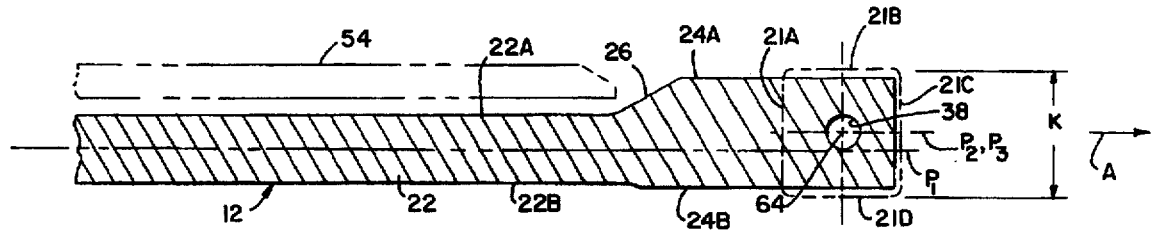

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *